T. JACOB.
TRAP SETTING DEVICE.
APPLICATION FILED SEPT. 5, 1916.

1,238,679.

Patented Aug. 28, 1917.

Inventor
Thos. Jacob.

By John Louis Walters
Attorney

UNITED STATES PATENT OFFICE.

THOMAS JACOB, OF TWIN BRIDGES, MONTANA.

TRAP-SETTING DEVICE.

1,238,679.  Specification of Letters Patent.  Patented Aug. 28, 1917.

Application filed September 5, 1916. Serial No. 118,511.

*To all whom it may concern:*

Be it known that I, THOMAS JACOB, a citizen of the United States, residing at Twin Bridges, in the county of Madison and State of Montana, have invented certain useful Improvements in Trap-Setting Devices, of which the following is a specification, reference being had therein to the accompanying drawing.

This invention comprehends the provision of a device for setting traps, thereby eliminating the danger of serious injury always present when attempting to set these traps by hand.

More specifically stated, the device embodies among other features a support upon which a plunger is slidably fitted and designed to engage the spring or springs on the trap, to move or hold the latter in an inactive position, thereby relieving the jaws of the trap of pressure, and permitting the same to be opened or set with the least effort.

Other objects of importance will appear as the nature of the invention is better understood from the following description when taken in connection with the accompanying drawing, the invention residing in the construction, combination and arrangement of parts as claimed.

In the drawing forming part of this specification like numerals of reference indicate similar parts in the several views and wherein—

Figure 1:
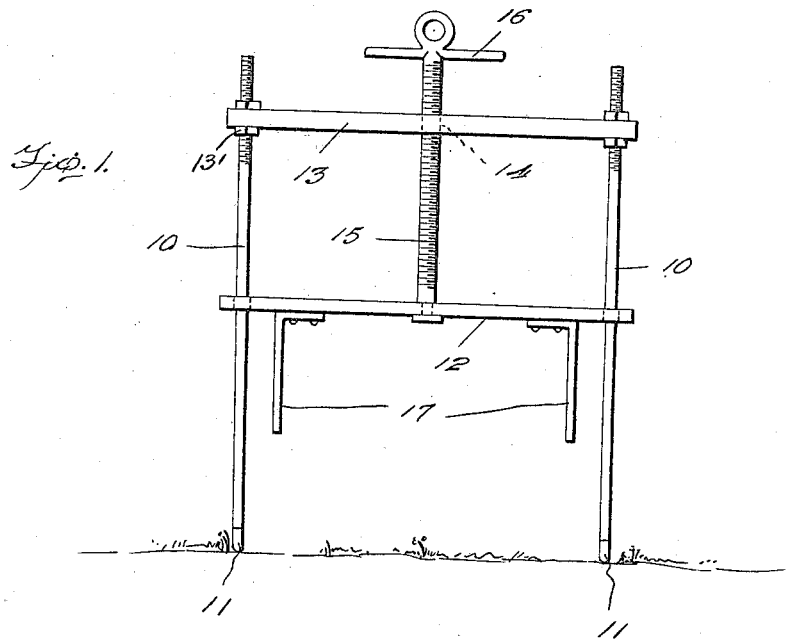
Figure 1 is a view of the device in elevation.
Figure 2:
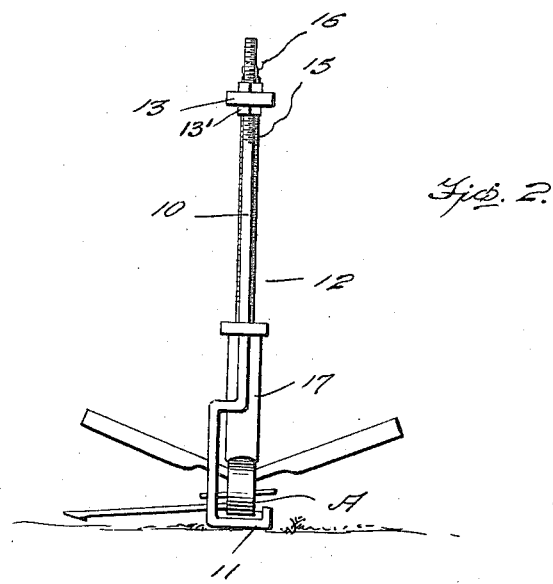
Fig. 2 is a view showing the manner of using the device.

The device forming the subject matter of my invention preferably embodies a pair of spaced parallel standards 10, each having an offset lower extremity 11 terminating to provide a hook-like portion upon which the trap rests while the setting device is being operated. The standards 10 constitute a support for the plunger, which in this particular instance consists of a transverse bar 12 suitably apertured adjacent its opposite extremities for the reception of the standards 10 upon which the bar is slidably mounted. Disposed above the bar 12 in parallelism therewith, is a transverse bar 13 suitably apertured adjacent its extremities to receive the standards 10 upon which the bar 13 is slidably adjustable. This bar however is adapted to be held fixed upon the standards in any of its adjusted positions by means of nuts 13' or the like, or in any other suitable manner. The bar 13 is provided with an interiorly threaded opening 14 through which the threaded rod 15 rising from the bar 12 extends, having threaded engagement with the threads of the opening so that by rotating the rod 15 in the proper direction the bar 12 will be either elevated or lowered upon the standards 10. The rod 15 adjacent its upper extremity is preferably provided with a cross handle 16 to facilitate the rotation of the rod although any other suitable handle may be provided. Depending from the transverse bar 12 adjacent its opposite end are arms 17 designed to engage the spring or springs A of the trap to move the same to an inactive position when it is desired to open or set the jaws of the trap.

In practice, the base of the trap A is positioned upon the hook-like terminals of the standard 10, with the transverse bar 12 in elevation. The rod 15 is now rotated in the proper direction to lower the bar 12, during which movement of the latter the arms 17 are brought into engagement with the spring or springs A of the trap. On further movement of the bar 12 the spring or springs A are forced to a lowered or inactive position, thereby relieving the jaws of the trap of all pressure, and permitting the same to be easily and quickly separated and moved to an opened position. In addition to forcing the spring or springs A of the trap to an active position, the construction of the device is such as to hold the springs in this position while the jaws are being opened or set and engaged by the trigger mechanism. Subsequent to the setting of the trap, the bar 12 can be elevated a slight distance to move the same out of engagement with the springs of the trap, and thus permitting the trap in its entirety to be removed from the device. The construction of the device is not only simple, but the arrangement of the component parts is such that the device can be conveniently and effectively handled for the purpose intended.

While it is believed that from the foregoing description the nature and advantages of the invention will be apparent, I desire to have it understood that I do not limit myself to this precise construction, and that such changes may be resorted to when desired as fall within the scope of what is claimed.

What is claimed is:—

A trap setting device including a pair of spaced parallel standards, supporting means formed integral with the lower ends of the standards for receiving a trap, a cross bar mounted on the upper ends of the standards and having a threaded opening therein, means adjustably engageable with the standards for holding the cross bar in a set position, another cross bar adjustably mounted on the standards beneath the first mentioned cross bar, spring engaging arms carried by and depending from the first mentioned cross bar, and a threaded rod adjustably mounted in the first cross bar and operably connected to the second cross bar whereby when rotated the second mentioned cross bar is adjusted to consequently move the spring of the trap into an inactive position.

In testimony whereof I affix my signature.

THOMAS JACOB.

Copies of this patent may be obtained for five cents each, by addressing the "Commissioner of Patents, Washington, D. C."